(12) United States Patent
Steeg

(10) Patent No.: US 6,439,404 B1
(45) Date of Patent: Aug. 27, 2002

(54) MULTIPURPOSE SUPPORT

(76) Inventor: Nicolas Steeg, 44, rue Servan, 75011 Paris (FR)

( * ) Notice: Subject to any disclaimer, the term of this patent is extended or adjusted under 35 U.S.C. 154(b) by 0 days.

(21) Appl. No.: 09/762,162

(22) PCT Filed: Jul. 27, 1999

(86) PCT No.: PCT/FR99/01837

§ 371 (c)(1),
(2), (4) Date: Feb. 5, 2001

(87) PCT Pub. No.: WO00/07485

PCT Pub. Date: Feb. 17, 2000

(30) Foreign Application Priority Data

Aug. 5, 1998 (FR) .............................. 98 10058

(51) Int. Cl.[7] .................................................. A47F 5/00
(52) U.S. Cl. ......................... 211/87.01; 211/55; D6/553
(58) Field of Search ........................ 211/55, 103, 87.01, 211/32; D6/553

(56) References Cited

U.S. PATENT DOCUMENTS

| | | | | |
|---|---|---|---|---|
| D19,907 S | * | 6/1890 | Morse | |
| 1,266,245 A | * | 5/1918 | Fuhrmann | |
| 2,066,822 A | * | 1/1937 | Cohen | |
| 2,428,073 A | * | 9/1947 | Handel | 211/87.01 |
| 2,858,265 A | * | 10/1958 | Schneider | |
| 3,536,286 A | * | 10/1970 | Kramer | |
| 4,069,920 A | * | 1/1978 | Ross | 211/87.01 |
| 4,367,819 A | * | 1/1983 | Lewis | 211/87.01 X |
| 4,372,450 A | * | 2/1983 | Licari et al. | 211/87.01 |
| 4,776,469 A | * | 10/1988 | Geleziunas | |
| 4,878,586 A | * | 11/1989 | Bancroft et al. | 211/87.01 X |
| 4,928,912 A | | 5/1990 | Florek | |
| 5,485,932 A | * | 1/1996 | Romm et al. | 211/103 X |
| 5,645,178 A | | 7/1997 | Conley, Jr. | |
| D417,996 S | * | 12/1999 | Mallen | D6/553 |

FOREIGN PATENT DOCUMENTS

| | | |
|---|---|---|
| CH | 497886 | 10/1970 |
| CH | 592433 | 10/1977 |
| FR | 603127 | 4/1926 |

* cited by examiner

Primary Examiner—Robert W. Gibson, Jr.
(74) Attorney, Agent, or Firm—Young & Thompson

(57) ABSTRACT

A multipurpose support includes at least one hook fixed on at least one slat. The support has one first and one second row of at least two mutually parallel slats. The two rows of slats are parallel to a common plane and the slats of the first row cross the slats of the second row. The at least one hook forms an angle of less than 45° with the plane. The hook is fixed in an intersection of one of the slats of the first row with one of the slats of the second row.

5 Claims, 2 Drawing Sheets

MULTIPURPOSE SUPPORT

SUMMARY OF THE INVENTION

The present invention relates to a multiple-use holder comprising at least one hook fixed to at least one slat. The holder is intended for, among other things, storing hollow objects such as glasses, cups, tankards, bottles, feeding bottles and various kinds of pots, or for objects such as keys, necklaces and ties, or for flat objects such as postcards, booklets and magazines. A holder of this kind is usually supported by or fixed to a vertical surface, such as a wall.

According to the invention, a holder of the type defined above is characterized in that it comprises, on the one hand, a first row and a second row of at least two mutually parallel slats, both rows of slats being parallel to the same plane and the slats of the first row intersecting the slats of the second row and, on the other hand, at least one hook forming with the said plane an angle of less than 45°, the hook(s) being fixed in a site of intersection of a slat belonging to the first row with a slat belonging to the second row.

Each site of intersection of the holder is preferably associated with a hook.

The angle formed by the hook with the plane parallel to the two rows of slats is preferably about 20°.

There are at least two slats in each row but the number of slats can be much greater in each of the rows. This number depends on the area of the holder and on its shape.

In each row, the slats are advantageously arranged at regular intervals. However, these intervals may be irregular depending on the artistic effect which it is wished to give to the holder.

The slats of any one row are advantageously of the same width, this width being also advantageously the same for the slats of the first and second rows.

The length of the slats of each row depends on the overall outline of the holder, which may be of any shape, such as rectangular, triangular, circular or other.

The slats of the first row may intersect the slats of the second row at any angle. Advantageously, the slats of the first row are perpendicular to the slats of the second row. When the holder is fixed to a vertical surface, the slats of the first row are preferably vertical and the slats of the second row horizontal.

The slats of a first row preferably comprise depressions so that each is able to house a slat belonging to the second row at their site of intersection. The form of these depressions will vary depending on the angle of intersection of the slats of the first row with the slats of the second row. Advantageously, the slats of both first and second rows comprise depressions so that the slats of the first row and of the second row fit together via their respective depressions in the sites of intersection. By this means it is possible to produce a flat assembly at the site of intersection of a slat belonging to the first row with a slat belonging to the second row.

According to the invention, as explained above, at least one hook is fixed in the site of intersection of a slat belonging to the first row with a slat belonging to the second row. This hook is advantageously straight, but could be slightly curved. In a preferred embodiment, the hook consists of a tongue that is fixed in the vicinity of one of its ends to the site of intersection between a slat belonging to the first row and a slat belonging to the second row, the other end being free. The free end may be of any shape, and in particular is rounded. All of the hooks are situated on the same side of the holder, when the holder is designed to be fixed to a flat surface.

The tongue is preferably arranged in such a way that its centre line, when projected, coincides with the centre line of the slat of the first row or with that of the slat of the second row intersecting in the site of intersection to which the tongue is fixed.

Where the holder is designed to be fixed to a vertical surface, the slats of the first row being vertical, the hooks advantageously all point upwards, this arrangement being particularly useful for draining hollow objects, such as glasses or bottles. However, the hooks could be arranged horizontally, e.g. for holding objects such as necklaces or ties.

In the preferred embodiment, the tongue forming the hook is advantageously fixed to the site of intersection by a wedge-shaped part forming an angle equal to that which the hook forms with the plane parallel to the two rows of slats. This part may be a separate part but is preferably an integral part of the tongue forming the hook. In this case, the wedge-shaped part is advantageously fitted into a depression formed in a slat belonging to the first or second row. In this way, in the slats of the first or second rows, a depression may be formed on both sides of any slat at the site of intersection.

The hook can be fixed to the site of intersection by any known means, e.g. glue, nails or screws.

In a preferred embodiment, fixing takes place at the sites of intersection using a flat-headed screw and a wing nut. The holder can therefore be sold as a kit and assembled at the place of use, the screws being used to fix together, at a site of intersection, a slat belonging to the first row with a slat belonging to the second row, plus the hook.

This holder may be made of any material, such as wood, plastic or metal, the slats and the hooks being preferably made from the same material. In a particularly preferred embodiment the slats and the hooks are of bamboo.

The description provided below, which refers to the appended drawing, of two embodiments of the holder will enable the invention to be understood more clearly.

DESCRIPTION OF THE PREFERRED EMBODIMENTS

Figure 1:
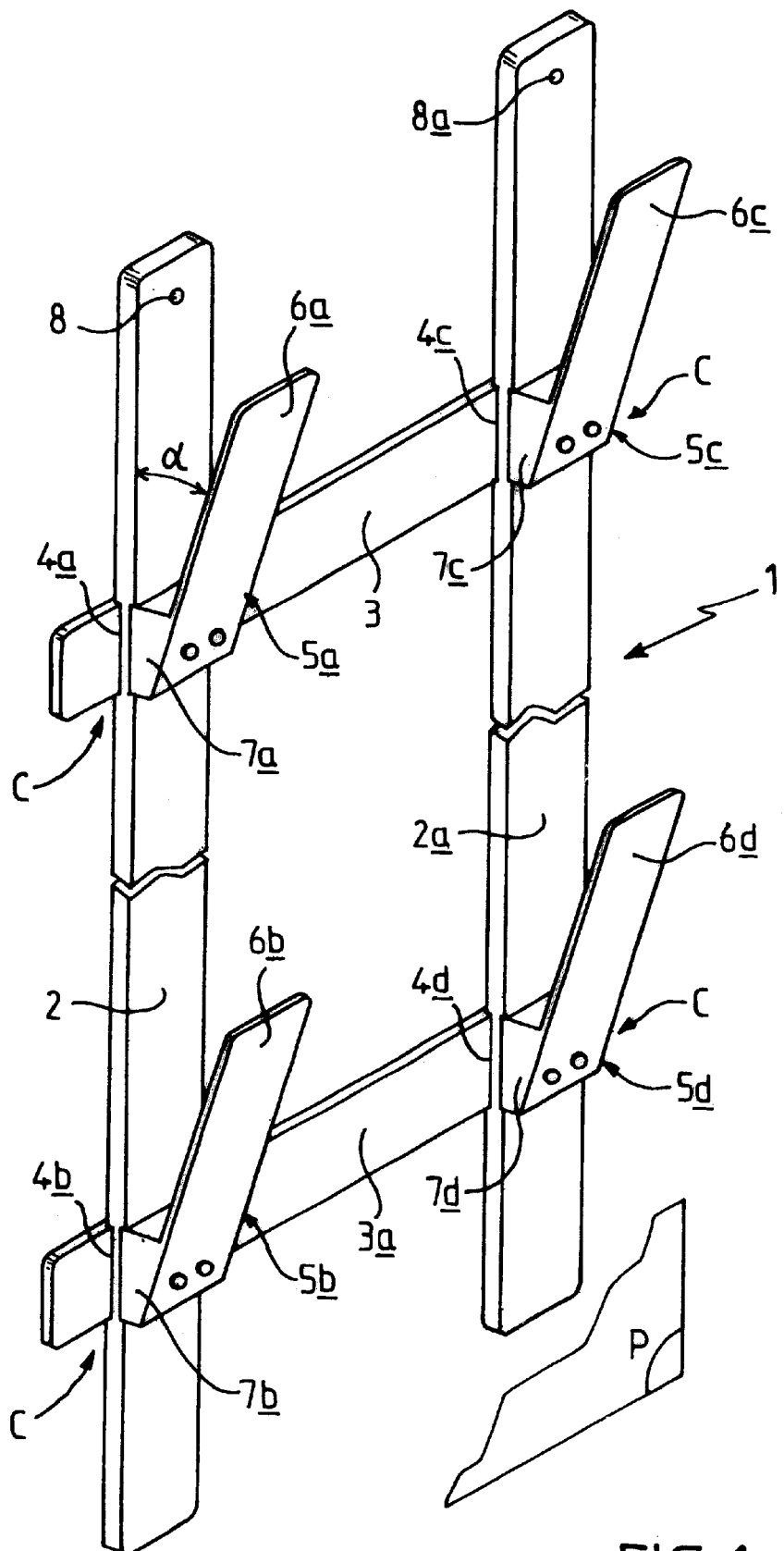
FIG. 1 is a perspective view of a first embodiment.

In FIG. 1 the holder is given the overall number 1. The holder 1 consists of two rows of slats, 2, 2a and 3, 3a, the slats 2 and 2a of the first row being vertical and the slats 3 and 3a of the second row being horizontal. The slats 2, 2a and the slats 3, 3a are therefore perpendicular to each other and both parallel to the same plane P.

In FIG. 1, only two slats 2, 2a of the first row and two slats 3, 3a of the second row are shown. The number of slats in each row may of course be greater. In the embodiment depicted, the slats 2, 2a are of the same width and the slats 3, 3a are also of the same width.

At the site of intersection C of the slats 2, 2a with the slats 3, 3a, the slats 2, 2a contain quadrilateral depressions 4a, 4b, 4c, 4d let into the thickness of the slats and each of these depressions houses a slat belonging to the second row, namely slat 3 in the case of depressions 4a and 4c and slat 3a in the case of depressions 4b and 4d. Hooks 5a, 5b and 5c, 5d are fixed to slats 2 and 2a, respectively, on the sites of intersection C. All hooks are identical, so only hook 5a will be described in detail.

Hook 5a is composed of a tongue 6a at the base of which is a wedge-shaped component 7a forming an integral part of the tongue 6a. The wedge 7a forms an angle of approximately 20°; consequently the tongue 6a forms with the slat 2 an angle a of approximately 20°. The tongue 6a is nailed through its wedge-shaped portion to the slat 2. All the hooks 5a 5b, 5c and 5d point upwards. In the embodiment illustrated, slats 2 and 2a each have a hole 8, 8a at their upper end for fastening the holder to a vertical surface. Other fastening means are also possible.

Figure 2:
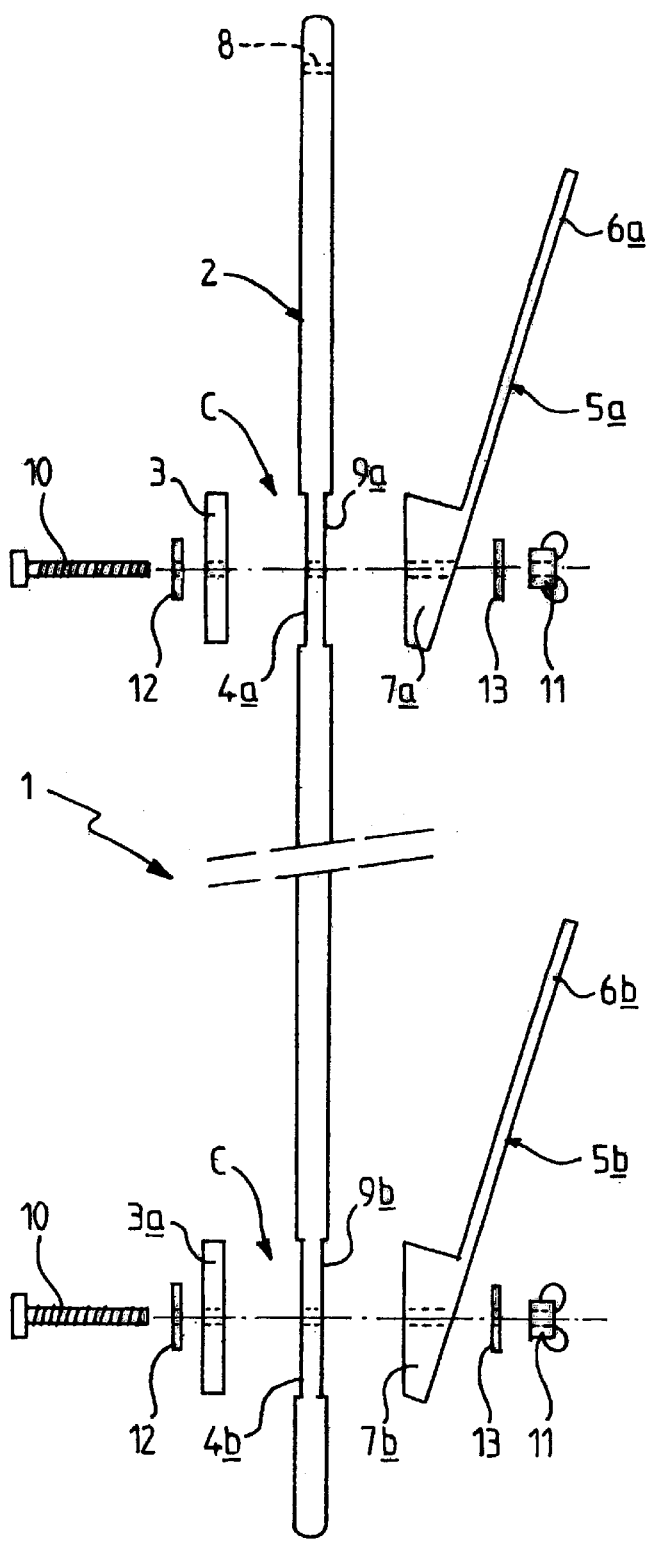
FIG. 2 is a side view of a second embodiment prior to assembly.
Figure 3:
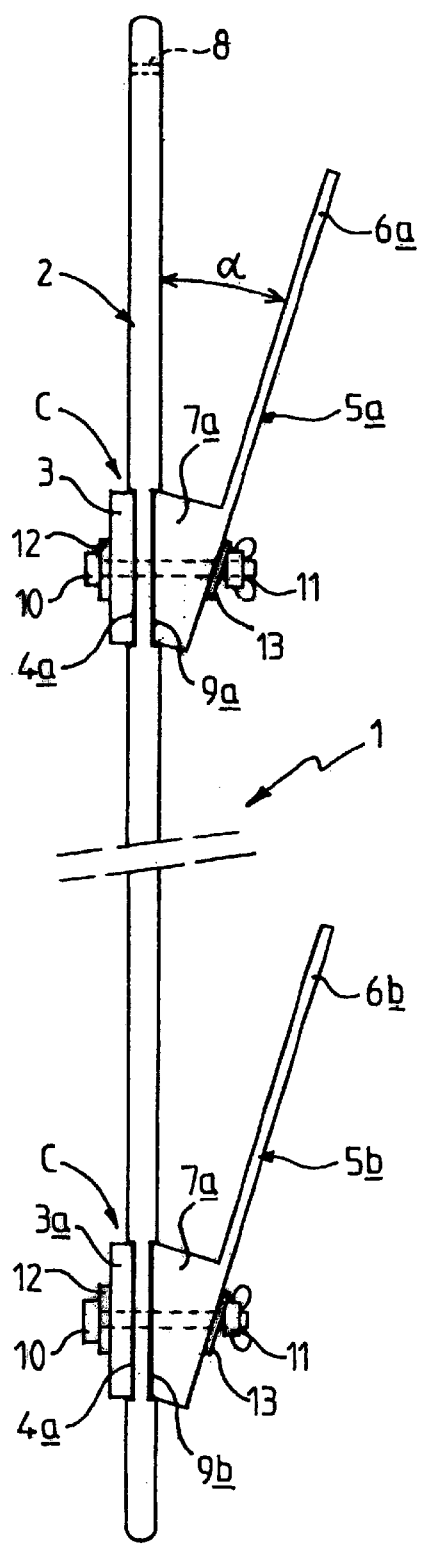
FIG. 3 is a side view of the second embodiment after assembly.

FIGS. 2 and 3 show another embodiment of the holder according to the invention. In these figures, the same numbers are used to denote the same parts.

In FIG. 2 it can be seen that slat 2 of the first row contains, in the thickness of the slat, at each site of intersection C, two depressions, one depression 4a intended for slat 3 of the second row and, on the other side of the slat, a second depression 9a intended for the hook 5a.

The wedge-shaped portion 7a and the depression 9a have the same area and so can be brought into contact when the wedge-shaped part 7a of the tongue 6a is fitted into the depression 9a.

In this embodiment, the hook 5a is fixed in the site of intersection C between slats 2 and 3 by a system composed of a screw 10 and a wing nut 11 with two washers 12 and 13. For this purpose the wedge-shaped part 7a, slat 2 and slat 3 are drilled so that the screw 10 can pass through them. In this embodiment, in which the parts are assembled in each site of intersection using a single screw, the depression 4a serves to prevent any excursion of the slat 3 relative to the slat 2 and, more particularly, the depression 9a serves to prevent any relative displacement of the hook 5a relative to the slat 2.

What is claimed is:

1. A multiple use holder comprising:

a first row of at least two mutually parallel slats;

a second row of at least two mutually parallel slats, the slats of the first row intersecting the slats of the second row, the slats of the first and second rows being parallel to a plane P;

at least one hook for holding hollow objects and fixed to at least one slat of said first and second rows of slats, said at least one hook forming with said plane P an angle of less than 45°, the hook being fixed at an intersection of one of the slats of the first row with one of the slats of the second row, wherein said at least one hook has a tongue for holding flat objects, said tongue having a free end pointing essentially upwards, and said slats of the first and second rows each have depressions, said slats of the first and second rows being connected together by respective depressions at said interconnection.

2. A multiple use holder comprising:

a first row of at least two mutually parallel slats;

a second row of at least two mutually parallel slats, the slats of the first row intersecting the slats of the second row, the slats of the first and second rows being parallel to a plane P;

at least one hook for holding hollow objects and fixed to at least one slat of said first and second rows of slats, said at least one hook forming with said plane P an angle of less than 45°, the hook being fixed at an intersection of one of the slats of the first row with one of the slats of the second row, wherein said at least one hook comprises a tongue for holding flat objects, said tongue having a free end pointing essentially upwards and a short side connected to said interconnection by a wedge-shaped part integral with the tongue.

3. The holder according to claim 2, wherein said wedge-shaped part fits into a depression in a slat of one of the first and second rows at said interconnection.

4. The holder according to claim 2, wherein said at least one hook is connected at said interconnection using a flat-headed screw and a wing-nut, said screw passing through the wedge shaped part and said one of said slat of the first row and said one of said slats of the second row.

5. The holder according to claim 2, wherein a centerline of said tongue, when projected perpendicularly to the plane P, coincides with a centerline of one of that slats at said interconnection.

* * * * *